United States Patent
Kwak et al.

(10) Patent No.: US 9,354,382 B2
(45) Date of Patent: May 31, 2016

(54) BACKLIGHT ASSEMBLY AND DISPLAY APPARATUS HAVING THE SAME

(71) Applicant: Samsung Display Co., Ltd, Yongin, Gyeonggi-Do (KR)

(72) Inventors: Sang-Gil Kwak, Cheonan-si (KR); Man-Soo Kim, Asan-si (KR); Joon-Ik Lee, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 123 days.

(21) Appl. No.: 14/451,314

(22) Filed: Aug. 4, 2014

(65) Prior Publication Data

US 2015/0131319 A1    May 14, 2015

(30) Foreign Application Priority Data

Nov. 11, 2013    (KR) ........................ 10-2013-0136588

(51) Int. Cl.
*F21V 8/00*        (2006.01)
*G02F 1/1335*      (2006.01)

(52) U.S. Cl.
CPC ............ *G02B 6/0073* (2013.01); *G02B 6/0088* (2013.01); *G02F 1/133608* (2013.01); *G02F 1/133615* (2013.01)

(58) Field of Classification Search
CPC ... G02B 6/0073; G02B 6/0088; G02B 12/006
USPC .......................................... 362/611, 632, 633
See application file for complete search history.

(56) References Cited

U.S. PATENT DOCUMENTS

| | | | |
|---|---|---|---|
| 6,954,243 B2 | 10/2005 | Ota et al. | |
| 7,810,966 B2 | 10/2010 | Hsu | |
| 8,206,023 B2 * | 6/2012 | Kang | G02B 6/0071 349/58 |
| 8,213,168 B2 | 7/2012 | McClure et al. | |
| 8,511,869 B1 * | 8/2013 | Fountain | A47G 33/0836 362/392 |
| 2003/0016313 A1 * | 1/2003 | Jeong | G02B 6/0088 349/58 |
| 2003/0169383 A1 * | 9/2003 | Kim | G02B 6/0088 349/58 |
| 2004/0160546 A1 * | 8/2004 | Huang | G02F 1/133608 349/58 |
| 2011/0157512 A1 * | 6/2011 | Mishima | G02B 6/0068 349/58 |
| 2012/0120339 A1 | 5/2012 | Kim et al. | |
| 2015/0043211 A1 * | 2/2015 | Liu | F21K 9/135 362/294 |

FOREIGN PATENT DOCUMENTS

| | | |
|---|---|---|
| KR | 10-2005-0093882 A | 9/2005 |
| KR | 10-2008-0089897 A | 10/2008 |
| KR | 10-2009-0115523 A | 11/2009 |

\* cited by examiner

*Primary Examiner* — Ali Alavi
(74) *Attorney, Agent, or Firm* — Innovation Counsel LLP

(57) ABSTRACT

A backlight assembly includes a light source unit configured to generate light, a lower receiving container having a bottom portion and a side wall and being configured to receive the light source unit, the lower receiving container shaped to cover a lower surface of the light source unit and a mold frame formed directly on the lower receiving container and having a cut portion, the cut portion having a first end portion and a second end portion, the first end portion and the second end portion spaced apart from each other and facing each other with a gap therebetween.

20 Claims, 8 Drawing Sheets

3600

4600

5600

BACKLIGHT ASSEMBLY AND DISPLAY APPARATUS HAVING THE SAME

PRIORITY STATEMENT

This application claims priority under 35 U.S.C. §119 to Korean Patent Application No. 10-2013-0136588, filed on Nov. 11, 2013 in the Korean Intellectual Property Office (KIPO), the contents of which are herein incorporated by reference in their entireties.

BACKGROUND

1. Field

Exemplary embodiments of the invention relate to a backlight assembly and a display apparatus having the backlight assembly. More particularly, exemplary embodiments of the invention relate to a backlight assembly capable of reducing strain in a display apparatus, and a display apparatus having the backlight assembly.

2. Description of the Related Art

Recently, flat panel display apparatuses having lower weight and reduced volume relative to Cathode Ray Tubes (CRTs) have been developed. Liquid Crystal Display (LCD), Plasma Display panels (PDPs), Field Emission Display Device (FED) and Light Emitting Display Device are actively being researched as flat type display apparatuses. However, among such flat display apparatuses, Liquid Crystal Display are more easily manufactured, have good drivability, realize a high-quality image, and thus are the focus of much attention.

However, ongoing efforts are being made in minimizing (slimming) the thicknesses of display apparatus, and research is increasingly conducted on designs with enhanced sense of beauty that can induce consumers to buy.

However, there are limitations in slimming display apparatuses and developing desirable new designs.

SUMMARY

Exemplary embodiments of the present inventive concept provide a backlight assembly capable of decreasing a strain of a display apparatus.

Exemplary embodiments of the present inventive concept also provide a display apparatus having the backlight assembly.

In an exemplary embodiment of according a backlight assembly to the present invention, the backlight assembly includes a light source unit configured to generate light; a lower receiving container having a bottom portion and a side wall and being configured to receive the light source unit, the lower receiving container shaped to cover a lower surface of the light source unit; and a mold frame formed directly on the lower receiving container and having a cut portion, the cut portion having a first end portion and a second end portion, the first end portion and the second end portion spaced apart from each other and facing each other with a gap therebetween.

In an exemplary embodiment, the lower receiving container may include a securing portion formed on the side wall.

In an exemplary embodiment, the lower receiving container may include metal and the mold frame may include macromolecule.

In an exemplary embodiment, a lower surface of the mold frame may contact an upper surface of the bottom portion of the lower receiving container. An inner surface of the side wall of the lower receiving container may contact a side surface of the mold frame. An upper surface of the lower receiving container may be covered by the mold frame.

In an exemplary embodiment, the first end portion and the second end portion may each have curved edges.

In an exemplary embodiment, the first end portion may have a protruding portion, and the second end portion may have a recessed portion corresponding to the protruding portion.

In an exemplary embodiment, a plurality of cutting portions may be formed in a longer side of the mold frame.

In an exemplary embodiment, a plurality of cutting portions may be formed in a first longer side and a second longer side of the mold frame, the second longer side facing the first longer side.

In an exemplary embodiment, the mold frame may include at least one selected from the group consisting of polymethyl methacrylate and polycarbonate.

In an exemplary embodiment of a display apparatus according to the present invention, the display apparatus includes a display panel configured to display an image; a lower receiving container configured to receive the display panel, the lower receiving container having a bottom portion and a side wall; and a mold frame formed directly on the lower receiving container and having a cut portion, the cut portion having a first end portion and a second end portion, the first end portion and the second end portion spaced apart from each other and facing each other.

In an exemplary embodiment, the display apparatus may further include a light source unit disposed between the display panel and the lower receiving container.

In an exemplary embodiment, the light source unit may include a flexible printed circuit board, a light source disposed on the flexible printed circuit board and a light guide plate configured to guide light from the light source.

In an exemplary embodiment, the lower receiving container may include a securing portion formed on the side wall.

In an exemplary embodiment, the lower receiving container may include metal and the mold frame may include macromolecule.

In an exemplary embodiment, a lower surface of the mold frame may contact an upper surface of the bottom portion of the lower receiving container. An inner surface of the side wall of the lower receiving container may contact a side surface of the mold frame. An upper surface of the lower receiving container may be covered by the mold frame.

In an exemplary embodiment, the first end portion and the second end portion may each have curved edges.

In an exemplary embodiment, the first end portion may have a protruding portion, and the second end portion may have a recessed portion corresponding to the protruding portion.

In an exemplary embodiment, a plurality of cutting portions may be formed in a longer side of the mold frame.

In an exemplary embodiment, a plurality of cutting portions may be formed in a first longer side and a second longer side of the mold frame, the second longer side facing the first longer side.

In an exemplary embodiment, the mold frame may include at least one selected from the group consisting of polymethyl methacrylate and polycarbonate.

According to one or more exemplary embodiments, a mold frame has a plurality of cut portions. Thus, a warping of the lower receiving container may be prevented despite the contraction of the mold frame.

In addition, end portions of the cutting portions may have curved cutting planes or edges. Thus, an inflow of foreign substances may be prevented.

BRIEF DESCRIPTION OF THE DRAWINGS

The above and other features and advantages of the present inventive concept will become more apparent by describing in detailed exemplary embodiments thereof with reference to the accompanying drawings, in which.

DETAILED DESCRIPTION OF THE INVENTIVE CONCEPT

Hereinafter, the present inventive concept will be explained in detail with reference to the accompanying drawings. The drawings are not necessarily to scale.

Figure 1:
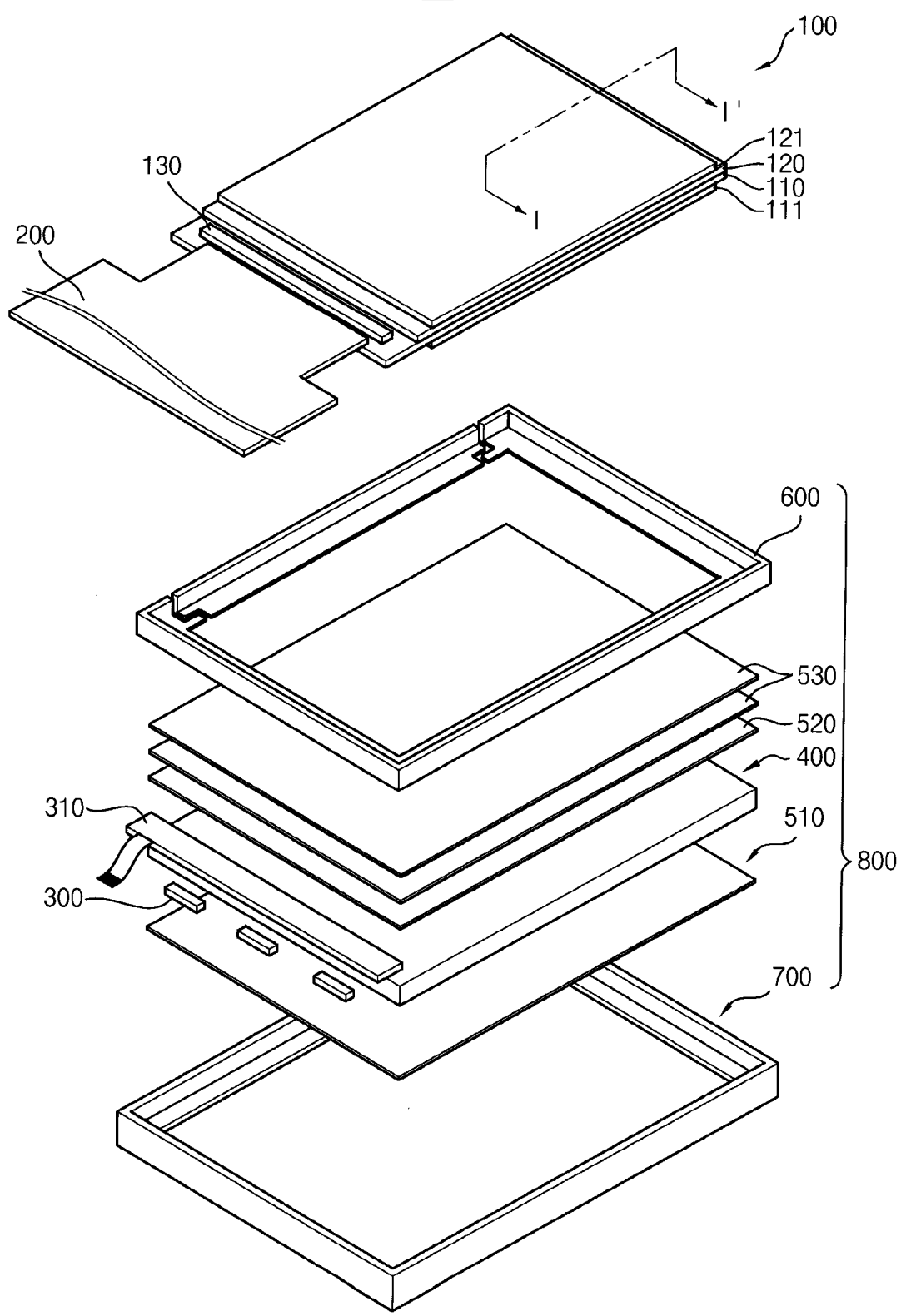
FIG. 1 is an exploded perspective view illustrating an exemplary embodiment of display apparatus according to the invention.
Figure 2:
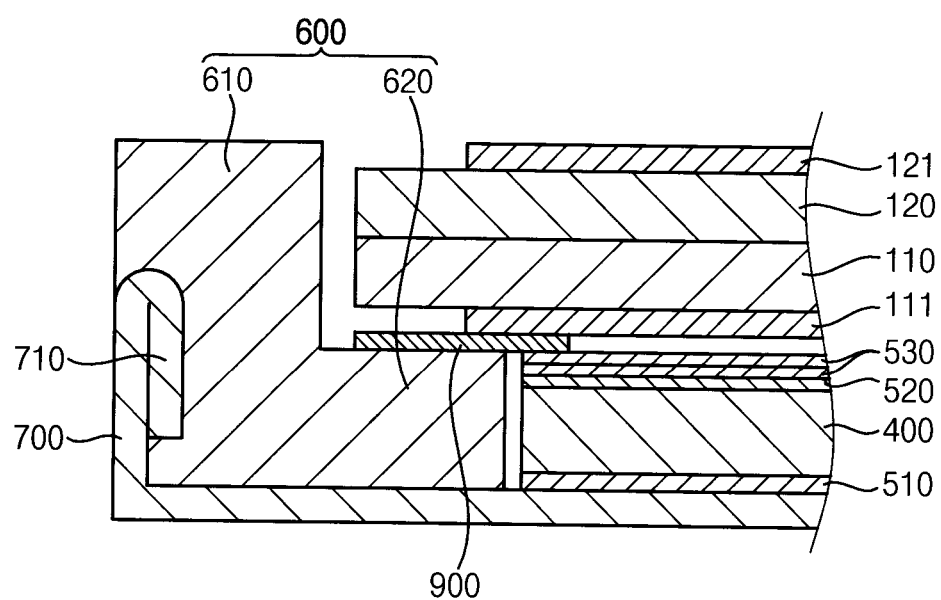
FIG. 2 is a cross-sectional view taken along line I-I' of FIG. 1.

FIG. 1 is an exploded perspective view illustrating an exemplary embodiment of a display apparatus according to the invention. FIG. 2 is a cross-sectional view taken along line I-I' of FIG. 1.

Referring to FIGS. 1 and 2, a display apparatus 1000 according to an exemplary embodiment of the present invention includes a display panel 100 for displaying an image, a main flexible printed circuit 200 electrically connected to the display panel 100 and a backlight assembly 800 for supplying light to the display panel 100.

The display panel 100 includes a first substrate 110, a second substrate 120 facing the first substrate 110, a liquid crystal layer disposed between the first substrate 110 and the second substrate 120, a first polarizing film 111 disposed on a lower surface of the first substrate 110 and a second polarizing film 121 disposed on an upper surface of the second substrate 120. An image is displayed on the display panel 100 using a light from the backlight assembly 800.

The first substrate 110 may include thin film transistors formed in a matrix layout. A source electrode of each thin film transistor is electrically connected to a data line. A gate electrode of each thin film transistor is electrically connected to a gate line. A drain electrode of each thin film transistor is electrically connected to a pixel electrode. The pixel electrode may be formed of transparent conductive material. For example, the pixel electrode may include a transparent conductive material such as indium tin oxide (ITO), indium zinc oxide (IZO) or the like. In addition, the pixel electrode may include titanium (Ti) and/or molybdenum titanium (MoTi).

The second substrate 120 is facing the first substrate 110. The second substrate 120 may include a color filter realizing a color. The second substrate 120 may include a common electrode. The common electrode may face the pixel electrode. The common electrode may be formed of a transparent conductive material. For example, the common electrode may include a transparent conductive material such as indium tin oxide (ITO), indium zinc oxide (IZO) or the like. In addition, the common electrode may include titanium (Ti) and/or molybdenum titanium (MoTi).

When a power voltage is applied to the gate of the thin film transistor that in turn turns on the thin film transistor, an electric field is formed between the pixel electrode and the common electrode. The electric field induces an aligning angle of the liquid crystal molecules of the liquid crystal layer disposed between the first substrate 110 and the second substrate 120. Thus, a light transmittance of the liquid crystal layer is varied in accordance with the variation of the aligning angle of the liquid crystal, so a desired image may be obtained.

The first polarizing film 111 may be disposed on a lower surface of the first substrate 110. The first polarizing film 111 may have a first polarization axis. The first polarizing film 111 may polarize light in a first direction according to the first polarization axis.

The second polarizing film 121 may be disposed on an upper surface of the second substrate 120. The second polarizing film 121 may have a second polarization axis. The second polarizing film 121 may polarize light in a second direction crossing the first direction, according to the second polarization axis. For example, the first polarization axis may be crossed with the second polarization axis.

The display panel 100 may further include a driving chip 130. The driving chip 130 may drive the first substrate 110. The driving chip 130 generates a driving signal driving the first substrate 110 in response to a control signal applied from other elements. In the present exemplary embodiment, the driving chip 130 may be disposed at an end of the first substrate 110, although the invention is not limited thereto. For example, the driving chip 130 may be electrically connected to the first substrate 110 by a chip on glass process.

The main flexible printed circuit 200 is electrically connected to an end of the first substrate 110 to apply a control signal to the display panel 100. For example, the main flexible printed circuit 200 may be electrically connected to the first substrate 110 by a chip on glass process. In the present exemplary embodiment, the main flexible printed circuit 200 is connected to the end of the first substrate 110 and bent toward a lower surface of the display panel 100. For example, the main flexible printed circuit 200 may be formed of a resin having flexibility.

The backlight assembly 800 is disposed under the display panel 100. The backlight assembly 800 includes a light source unit for generating light, a mold frame 600 covering an outside of the light source unit and a lower receiving container 700 covering an outside of the mold frame 600 and integrally formed with the mold frame 600.

The light source unit may include a flexible printed circuit board 310, light sources 300, a light guide plate 400 and a plurality of optical sheets.

The flexible printed circuit board 310 may provide the light sources 300 disposed thereon with driving power. In the present exemplary embodiment, the flexible printed circuit board 310 may be disposed under the first substrate 110 to correspond to an end of the display panel 100. For example, the flexible printed circuit board 310 may be formed of a resin having flexibility. The flexible printed circuit board 310 may include metal lines disposed thereon.

The light sources 300 disposed on the flexible printed circuit board 310 are configured to generate light. In the present exemplary embodiment, the light sources 300 may be mounted on the flexible printed circuit board 310. For example, the light sources 300 may each include a light emitting diode (LED) emitting a white light. The number of light sources 300 may be determined considering the size and brightness of the display panel 100. In the present exemplary embodiment, the flexible printed circuit board 310 and the light sources 300 may be disposed at an end of the light guide plate 400.

The light guide plate 400 may be disposed under the display panel 100. The light guide plate 400 may be formed as a flat and relatively thin quadrilateral platelike shape, although any shape is contemplated. The light guide plate 400 may be disposed adjacent to the light sources 300 to face a light exit surface of the light sources 300. The light guide plate 400 may include a groove (not shown). The light sources 300 are inserted into the groove (not shown), so that a loss of light may be decreased. The light guide plate 400 guides light emitted from the light sources 300 toward the display panel 100.

The light guide plate 400 includes a transparent material to minimize a loss of light from the light sources 300. For example, the light guide plate 400 may include a material having superior strength, such as polymethylmethacrylate (PMMA).

In order to reduce a thickness of the light guide plate 400, the light guide plate 400 may include polycarbonate (PC). The polycarbonate is inferior in strength to the polymethylmethacrylate, but the polycarbonate is superior in heat-resistance to the polymethymethacrylate.

The optical sheets may improve luminance characteristics of light emitted from the light guide plate 400. The optical sheets may include a reflecting sheet 510, a diffusion sheet 520 and a prism sheet 530.

The reflecting sheet 510 may be disposed under the light guide plate 400. The reflecting sheet 510 reflects light leaked through a lower surface of the light guide plate 400 back into the light guide plate 400, so that light efficiency is enhanced.

The diffusion sheet 520 may be disposed on the light guide plate 400. The diffusion sheet 520 may diffuse light exiting from the light guide plate 400.

The prism sheet 530 may be disposed on the diffusion sheet 520. The prism sheet 530 may condense light exiting from the light guide plate 400. For example, the prism sheet 530 may include a vertical prism sheet condensing light in a vertical direction and a horizontal prism sheet condensing light in a horizontal direction.

The mold frame 600 may cover an outside of the light source unit to expose an upper surface of the light source unit. The mold frame 600 may be engaged with the display panel 100 disposed over the light source unit. The mold frame 600 may be formed as a frame shape. The mold frame 600 may be formed with a macromolecule material. For example, the mold frame 600 may include a material having superior strength, such as polymethylmethacrylate (PMMA).

In order to reduce a thickness of the mold frame 600, the mold frame 600 may include polycarbonate (PC). The polycarbonate is inferior in strength to the polymethylmethacrylate, but the polycarbonate is superior in heat-resistance to the polymethymethacrylate.

The mold frame 600 may include a side wall portion 610 and a supporting portion 620. The side wall portion 610 may surround an edge of the display panel 100. The supporting portion 620 may extend from the side wall portion 610 inward toward the geometric center of the mold frame 600. An edge of the display panel 100 may be disposed on the supporting portion 620 so as to be supported thereby. A height of the supporting portion 620 may be the same as a height of the light source unit. The supporting portion 620 may guide and support the edge of the display panel 100.

The mold frame 600 according an exemplary embodiment of the invention may be formed by an insert injection molding process. The mold frame 600 may be integrally formed with the lower receiving container 700. Thus, the mold frame 600 and the lower receiving container 700 may be formed to have a low profile.

The mold frame 600 may include a plurality of cutting or cut portions formed in a first longer side of the mold frame 600, as will now be described. For example, the cutting portions may be formed at both ends of the first longer side of the mold frame 600. In the present exemplary embodiment, the mold frame 600 may have two cutting portions.

The mold frame 600 may be formed on the lower receiving container 700 by an insert injection molding process. Thus, the mold frame 600 is integrally formed with the lower receiving container 700. Accordingly, when the mold frame 600 without cutting portions is constricted, the lower receiving container 700 may be warped. However, the mold frame 600 according to the present exemplary embodiment has cut portions, so that a warping of the lower receiving container 700 may be prevented despite the contraction of the mold frame 600.

The cut portion may include a first end portion 630 and a second end portion 640. The first end portion 630 may have a curved cutting plane, or edge. The second end portion 640 is spaced apart from the first end portion 630 so that a gap is formed therebetween. The second end portion 640 faces the first end portion 630. The second end portion 640 may have a curved cutting plane corresponding to the curved cutting plane of the first end portion 630. Since the mold frame 600 has gaps between its cutting portions, there is a risk that a foreign substance may enter into an inner or interior space of a display apparatus through the gap between the respective cutting portions. However, the first end portion 630 and the second end portion 640 according to the present exemplary embodiment each have a curved cutting plane, so that inflow of a foreign substance may be prevented.

The lower receiving container 700 may receive the light source unit. The lower receiving container 700 may include a material having superior strength, such as a metal. For example, the lower receiving container 700 may be formed as a metal chassis.

The lower receiving container 700 may be integrally formed with the mold frame 600. The mold frame 600 may be formed on the lower receiving container 700 by an insert injection molding process. After the lower receiving container 700 is disposed in a mold for the mold frame 600, a mold material is inserted into the mold. Thus, the mold frame 600 may be directly formed on the lower receiving container 700. When a mold frame and a lower receiving container are manufactured separately, a gap between the mold frame and the lower receiving container may be generated. However, the mold frame 600 according to the present exemplary embodiment is directly formed on the lower receiving container 700, so that a gap between the mold frame and the lower receiving container may be minimized.

The lower receiving container 700 may include a securing portion 710. The securing portion 710 may be formed on the side wall of the lower receiving container 700. The securing portion 710 may enhance a clamping force between the mold frame 600 and the lower receiving container 700.

The securing portion 710 may be extended from the side wall of the lower receiving container 700. The securing portion 710 is bent toward a bottom portion of the lower receiving container 700. For example, the securing portion 710 may be formed by hemming. The securing portion 710 may have a general "U" or "V" shape in a cross-sectional view, being an upper edge of the sidewall of container 700 which is bent inward and downward.

The securing portion 710 according to the present exemplary embodiment may enhance a clamping force between the mold frame 600 and the lower receiving container 700. Thus, a manufacturing quality between the mold frame 600 and the lower receiving container 700 may be improved.

The mold frame 600 and the lower receiving container 700 may be integrally formed. For example, a lower surface of the mold frame 600 may contact, and be formed directly on, an upper surface of the bottom portion of the lower receiving container 700. An inner surface of the side wall of the lower receiving container 700 may contact a side surface of the mold frame 600. An upper surface of the wall of the lower receiving container 700 may be covered by the mold frame 600.

The display apparatus 1000 may include a bonding sheet 900. The bonding sheet 900 may be disposed on the supporting portion 620 of the mold frame 600 to overlap an edge of the optical sheet. The bonding sheet 900 may have a frame shape, i.e. a rectangular outer edge with a cutout in the center. The bonding sheet 900 may bond a lower surface of the display panel 100 to an upper surface of the supporting portion 620 of the mold frame 600. For example, the bonding sheet 900 may be formed as a double-sided tape.

Figure 3:
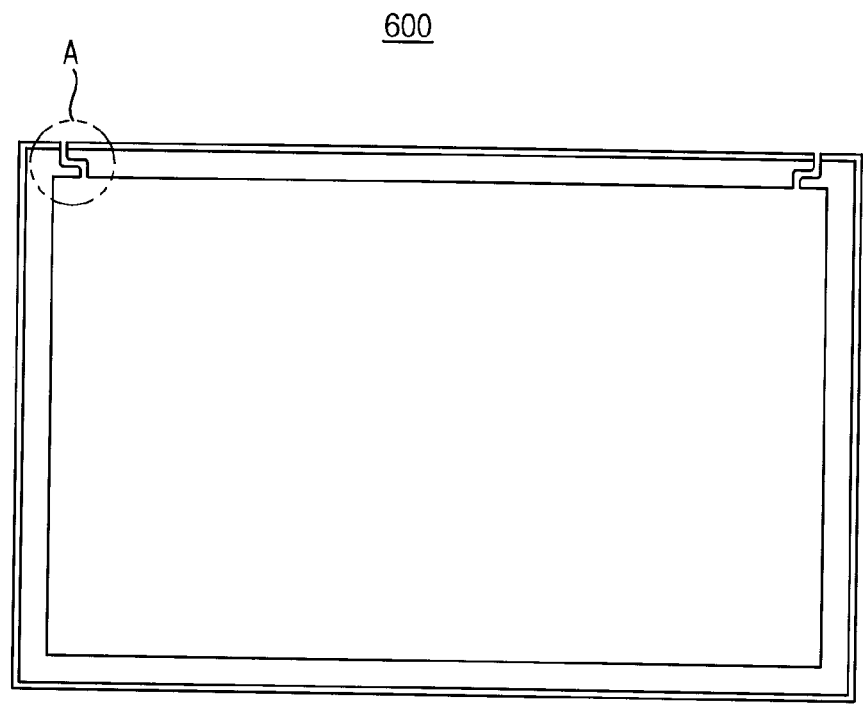
FIG. 3 is a plan view illustrating an exemplary embodiment of a mold frame according to the invention.
Figure 4:
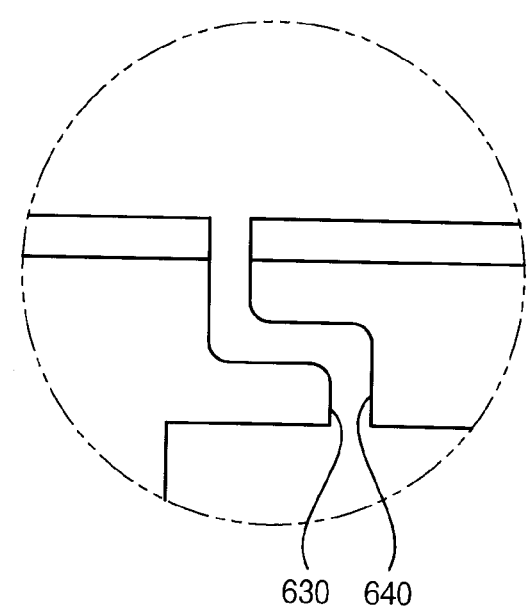
FIG. 4 is a plan view magnifying portion "A" of FIG. 3.

FIG. 3 is a plan view illustrating an exemplary embodiment of a mold frame according to the invention. FIG. 4 is a plan view magnifying portion "A" of FIG. 3.

Referring to FIGS. 3 and 4, a mold frame 600 according to the present exemplary embodiment may include a plurality of cutting portions. The cutting portions may be formed at both sides or ends of a first longer side of the mold frame 600. In the present exemplary embodiment, the mold frame 600 may have two cutting portions.

The mold frame 600 may be formed on the lower receiving container 700 by an insert injection molding process. Thus, the mold frame 600 is integrally formed with the lower receiving container 700. Accordingly, when the mold frame 600 is constricted, the lower receiving container 700 may be warped. However, the mold frame 600 according to the present exemplary embodiment has the cutting portions, so that a warping of the lower receiving container 700 may be prevented despite the contraction of the mold frame 600.

The cutting portion may include a first end portion 630 and a second end portion 640. The first end portion 630 may have a curved cutting plane, or edge. The second end portion 640 is spaced apart from the first end portion 630. The second end portion 640 faces the first end portion 630. The second end portion 640 may have a curved cutting plane or edge, corresponding to the curved cutting plane of the first end portion 630.

Since the mold frame 600 has one or more cutting portions, a foreign substance may enter into an inner space of a display apparatus through the cutting portion. However, the first end portion 630 and the second end portion 640 according to the present exemplary embodiment have curved profiles, so that an inflow of the foreign substance may be prevented.

Figure 5:
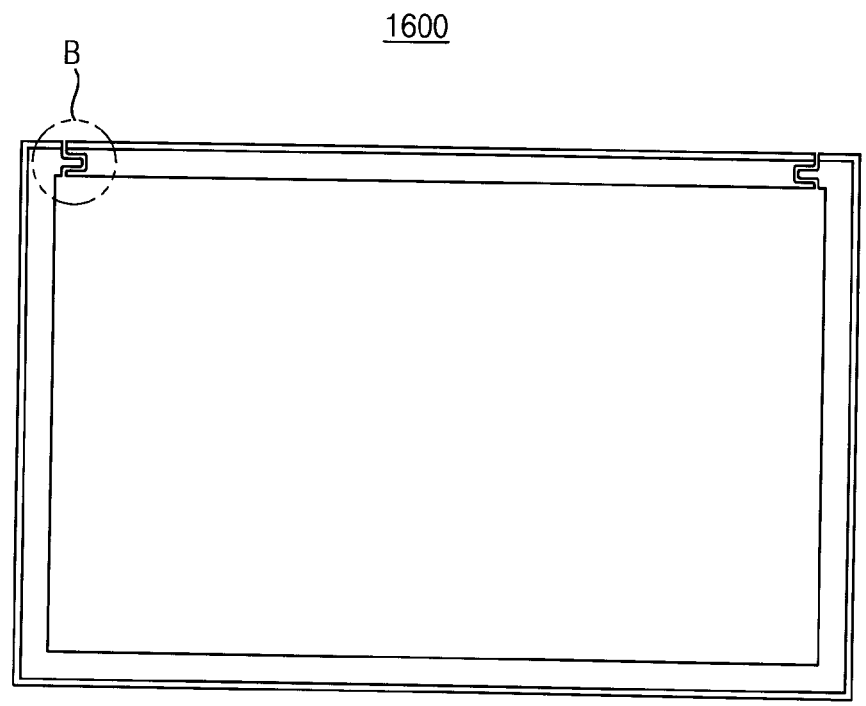
FIG. 5 is a plan view illustrating another exemplary embodiment of a mold frame according to the invention.
Figure 6:
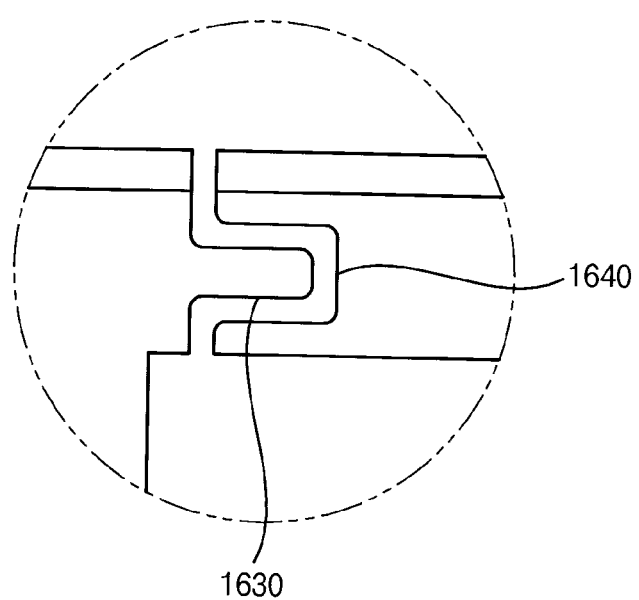
FIG. 6 is a plan view magnifying portion "B" of FIG. 5.

FIG. 5 is a plan view illustrating another exemplary embodiment of a mold frame according to the invention. FIG. 6 is a plan view magnifying portion "B" of FIG. 5.

Referring to FIGS. 5 and 6, a mold frame 1600 according to the present exemplary embodiment may include a plurality of cutting portions. The cutting portions may be formed at both sides, or ends, of a first longer side of the mold frame 1600. In the present exemplary embodiment, the mold frame 600 may have two cutting portions.

The mold frame 1600 may be formed on the lower receiving container 700 by an insert injection molding process. Thus, the mold frame 1600 is integrally formed with the lower receiving container 700. Accordingly, when the mold frame 1600 is constricted, the lower receiving container 700 may be warped. However, the mold frame 1600 according to the present exemplary embodiment has the cutting portions, so that a warping of the lower receiving container 700 may be prevented despite the contraction of the mold frame 1600.

The cutting portion may include a first end portion 1630 and a second end portion 1640. The first end portion 1630 may have a protruding portion. The second end portion 1640 is spaced apart from the first end portion 1630. The second end portion 640 faces the first end portion 1630. The second end portion 1640 may have a dent portion or recess corresponding to the protruding portion of the first end portion 1630.

Since the mold frame 1600 has one or more cutting portions, a foreign substance may enter into an inner space of a display apparatus through the cutting portion. However, the first end portion 1630 and the second end portion 1640 according to the present exemplary embodiment have the protruding portion and the dent portion respectively, so that an inflow of the foreign substance may be prevented.

Figure 7:
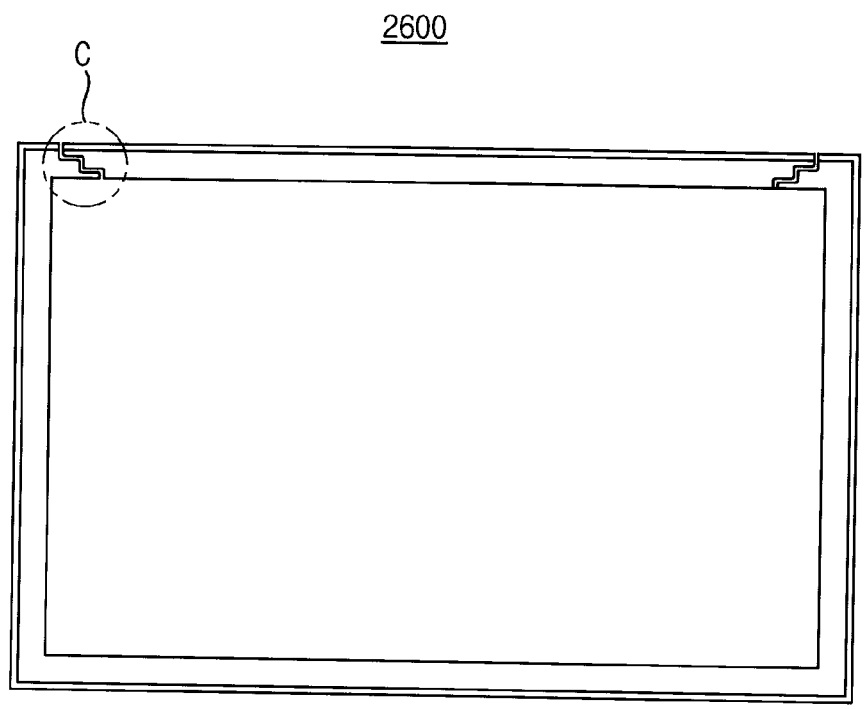
FIG. 7 is a plan view illustrating still another exemplary embodiment of a mold frame according to the invention.
Figure 8:
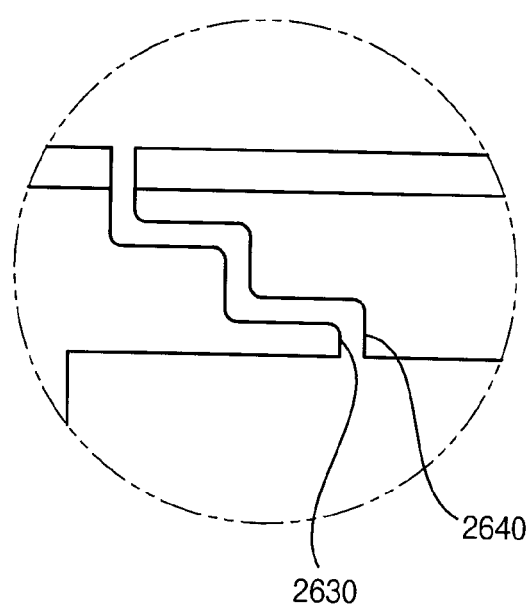
FIG. 8 is a plan view magnifying portion "C" of FIG. 7.

FIG. 7 is a plan view illustrating still another exemplary embodiment of a mold frame according to the invention. FIG. 8 is a plan view magnifying portion "C" of FIG. 7.

Referring to FIGS. 7 and 8, a mold frame 2600 according to the present exemplary embodiment may include a plurality of cutting portions. The cutting portions may be formed at both sides or ends of a first longer side of the mold frame 2600. In the present exemplary embodiment, the mold frame 2600 may have two cutting portions.

The mold frame 2600 may be formed on the lower receiving container 700 by an insert injection molding process. Thus, the mold frame 2600 is integrally formed with the lower receiving container 700. Accordingly, when the mold frame 2600 is constricted, the lower receiving container 700 may be warped. However, the mold frame 2600 according to the present exemplary embodiment has one or more cutting portions, so that a warping of the lower receiving container 700 may be prevented despite the contraction of the mold frame 2600.

The cutting portion may include a first end portion 2630 and a second end portion 2640. The first end portion 2630 may have a doubly curved cutting plane with a step shaped profile having alternating vertical and horizontal portions. The second end portion 2640 is spaced apart from the first end portion 2630. The second end portion 2640 faces the first end portion 2630. The second end portion 2640 may have a doubly curved cutting plane corresponding to the doubly curved cutting plane of the first end portion 2630.

Since the mold frame 2600 has the cutting portion, a foreign substance may enter into in an inner space of a display apparatus through the cutting portion. However, the first end portion 2630 and the second end portion 2640 according to the present exemplary embodiment have the doubly curved cutting plane, so that an inflow of the foreign substance may be prevented.

Figure 9:
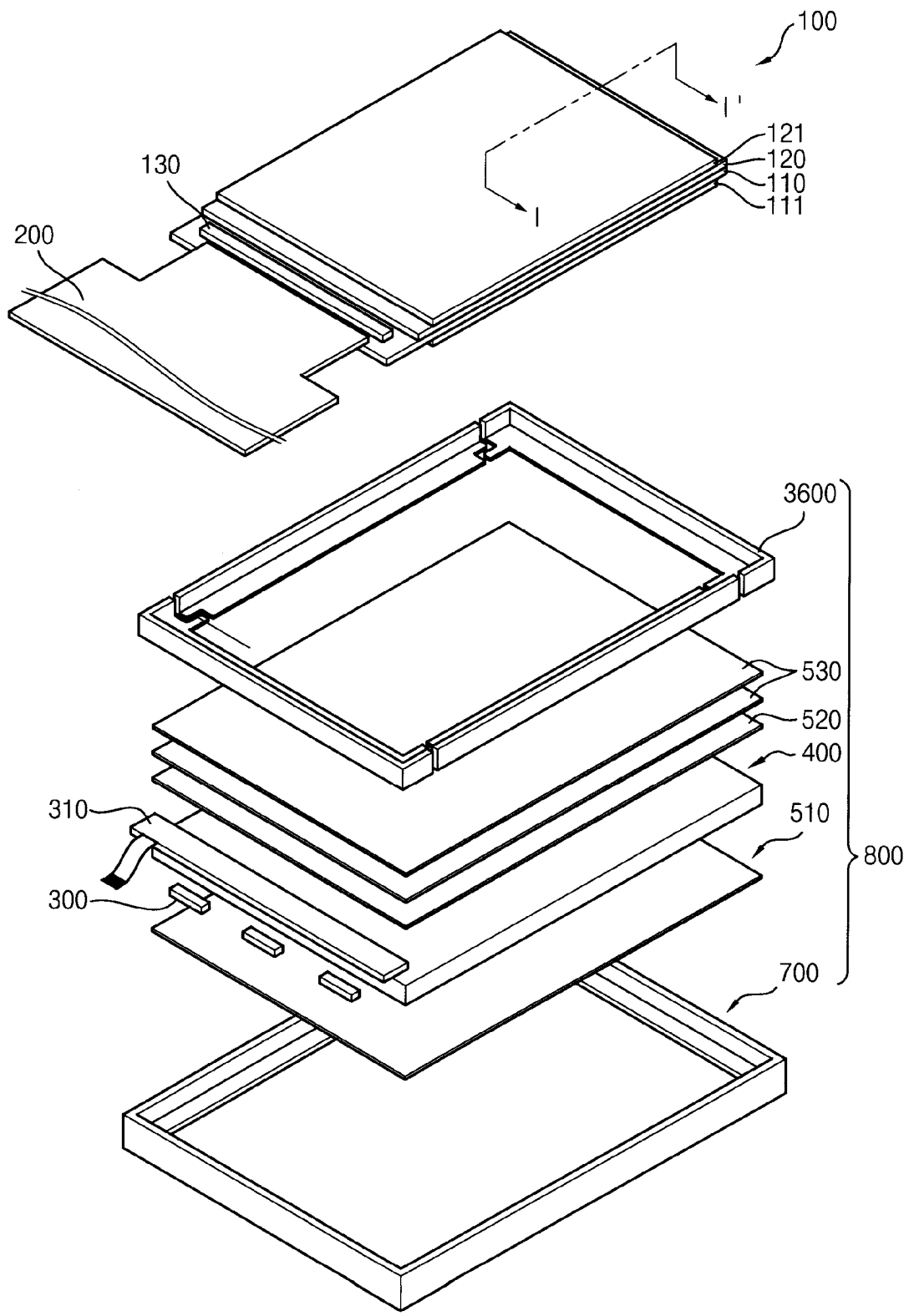
FIG. 9 is an exploded perspective view illustrating another exemplary embodiment of a display apparatus according to the invention.

FIG. 9 is an exploded perspective view illustrating another exemplary embodiment of a display apparatus according to the invention.

A display apparatus according to the present exemplary embodiment is substantially the same as the display apparatus according to the previous exemplary embodiment of FIG. 1 except for a mold frame 3600, and thus the same reference numerals will be used to refer to the same or like parts as those described in the previous example embodiment of FIG. 1.

Referring to FIG. 9, a display apparatus 1000 according to an exemplary embodiment of the present invention includes a display panel 100 for displaying an image, a main flexible printed circuit 200 electrically connected to the display panel 100 and a backlight assembly 800 for supplying light to the display panel 100.

The display panel 100 includes a first substrate 110, a second substrate 120 facing the first substrate 110, a liquid crystal layer disposed between the first substrate 110 and the second substrate 120, a first polarizing film 111 disposed on a lower surface of the first substrate 110 and a second polarizing film 121 disposed on an upper surface of the second substrate 120. An image is displayed on the display panel 100 using a light from the backlight assembly 800.

The first substrate 110 may include a plurality of thin film transistors formed in a matrix layout. A source electrode of each thin film transistor is electrically connected to a data line. A gate electrode of each thin film transistor is electrically connected to a gate line. A drain electrode of each thin film transistor is electrically connected to a pixel electrode. The pixel electrode may be formed of transparent conductive material. For example, the pixel electrode may include a transparent conductive material, such as indium tin oxide (ITO), indium zinc oxide (IZO) or the like. In addition, the pixel electrode may include titanium (Ti) and/or molybdenum titanium (MoTi).

The second substrate 120 is facing the first substrate 110. The second substrate 120 may include a color filter realizing a color. The second substrate 120 may include a common electrode. The common electrode may face the pixel electrode. The common electrode may be formed of transparent conductive material. For example, the common electrode may include a transparent conductive material, such as indium tin oxide (ITO), indium zinc oxide (IZO) and the like. In addition, the common electrode may include titanium (Ti) and/or molybdenum titanium (MoTi).

When a power voltage is applied to the gate of a thin film transistor that in turn turns on the thin film transistor, an electric field is formed between the pixel electrode and the common electrode. The electric field induces an aligning angle of the liquid crystal molecules of the liquid crystal layer disposed between the first substrate 110 and the second substrate 120. Thus, a light transmittance of the liquid crystal layer is varied in accordance with the variation of the aligning angle of the liquid crystal, so a desired image may be obtained.

The first polarizing film 111 may be disposed on a lower surface of the first substrate 110. The first polarizing film 111 may have a first polarization axis. The first polarizing film 111 may polarize light in a first direction along the first polarization axis.

The second polarizing film 121 may be disposed on an upper surface of the second substrate 120. The second polarizing film 121 may have a second polarization axis. The second polarizing film 121 may polarize light in a second direction along the second polarization axis. For example, the first polarization axis may be crossed with the second polarization axis.

The display panel 100 may further include a driving chip 130. The driving chip 130 may drive the first substrate 110. The driving chip 130 generates a driving signal driving the first substrate 110 in response to a control signal applied from other elements. In the present exemplary embodiment, the driving chip 130 may be disposed at an end of the first substrate 110. For example, the driving chip 130 may be electrically connected to the first substrate 110 by a chip on glass process.

The main flexible printed circuit 200 is electrically connected to an end of the first substrate 110 to apply a control signal to the display panel 100. For example, the main flexible printed circuit 200 may be electrically connected to the first substrate 110 by a chip on glass process. In the present exemplary embodiment, the main flexible printed circuit 200 is connected to the end of the first substrate 110 and bent around to a lower surface of the display panel 100. To that end, the main flexible printed circuit 200 may be formed of a resin having flexibility.

The backlight assembly 800 is disposed under the display panel 100. The backlight assembly 800 includes a light source unit for generating light, a mold frame 3600 covering an outside of the light source unit and a lower receiving container 700 covering an outside of the mold frame 3600 and integrally formed with the mold frame 3600.

The light source unit may include a flexible printed circuit board 310, light sources 300, a light guide plate 400 and a plurality of optical sheets.

The flexible printed circuit board 310 may provide light sources 300 disposed thereon with driving power. In the present exemplary embodiment, the flexible printed circuit board 310 may be disposed under the first substrate 110 to correspond to an end of the display panel 100. For example, the flexible printed circuit board 310 may be formed of a resin having flexibility. The flexible printed circuit board 310 may include at least one metal line disposed thereon.

The light sources 300 are disposed on the flexible printed circuit board 310 to generate light. In the present exemplary embodiment, each light source 300 may be mounted on the flexible printed circuit board 310. For example, each light source 300 may include a light emitting diode (LED) emitting a white light. The number of the light sources 300 may be determined in consideration of size and brightness of the display panel 100. In the present exemplary embodiment, the flexible printed circuit board 310 and the light sources 300 may be disposed an end of the light guide plate 400.

The light guide plate 400 may be disposed under the display panel 100. The light guide plate 400 may be formed as a thin rectangular platelike shape. The light guide plate 400 may be disposed adjacent to the light sources 300 to face a light exit surface of the light sources 300. The light guide plate 400 may include a groove (not shown). The light sources 300 can be inserted into the groove (not shown), so that a loss of light may be decreased. The light guide plate 400 guides light emitted from the light sources 300 toward the display panel 100.

The light guide plate 400 includes a transparent material to minimize a loss of light from the light sources 300. For example, the light guide plate 400 may include a material having superior strength, such as polymethylmethacrylate (PMMA).

In order to reduce a thickness of the light guide plate 400, the light guide plate 400 may include polycarbonate (PC). The polycarbonate is inferior in strength to the polymethylmethacrylate, but the polycarbonate is superior in heat-resistance to the polymethymethacrylate.

The optical sheets may improve luminance characteristics of light emitted from the light guide plate 400. The optical sheets may include a reflecting sheet 510, a diffusion sheet 520 and a prism sheet 530.

The reflecting sheet 510 may be disposed under the light guide plate 400. The reflecting sheet 510 reflects light leaked through a lower surface of the light guide plate 400 back into the light guide plate 400, so that light efficiency is enhanced.

The diffusion sheet 520 may be disposed on the light guide plate 400. The diffusion sheet 520 may diffuse light exiting from the light guide plate 400.

The prism sheet 530 may be disposed on the diffusion sheet 520. The prism sheet 530 may condense light exiting from the light guide plate 400. For example, the prism sheet 530 may include a vertical prism sheet condensing light in a vertical direction and a horizontal prism sheet condensing light in a horizontal direction.

The mold frame 3600 may cover an outside of the light source unit to expose an upper surface of the light source unit. The mold frame 3600 may be engaged with the display panel 100 disposed over the light source unit. The mold frame 3600 may be formed as a frame shape. The mold frame 3600 may be formed with a macromolecule material. For example, the mold frame 3600 may include a material having superior strength, such as polymethylmethacrylate (PMMA).

In order to reduce a thickness of the mold frame 3600, the mold frame 3600 may include polycarbonate (PC). The polycarbonate is inferior in strength to the polymethylmethacrylate, but the polycarbonate is superior in heat-resistance to the polymethymethacrylate.

The mold frame 3600 according an exemplary embodiment of the invention may be formed by an insert injection molding process. The mold frame 3600 may be integrally formed with the lower receiving container 700. Thus, the mold frame 3600 and the lower receiving container 700 may be formed to have a low profile.

The mold frame 3600 may include a plurality of cutting portions formed in a first longer side of the mold frame 3600 and in a second longer side opposite to and facing the first longer side of the mold frame 3600. For example, the cutting portions may be formed at both ends of the first longer side of the mold frame 3600 and at both ends of the second longer side of the mold frame 3600. In the present exemplary embodiment, the mold frame 3600 may have four cutting portions.

The mold frame 3600 may be formed on the lower receiving container 700 by an insert injection molding process. Thus, the mold frame 3600 is integrally formed with the lower receiving container 700. Accordingly, when the mold frame 3600 without cutting portions is constricted, the lower receiving container 700 may be warped. However, the mold frame 3600 according to the present exemplary embodiment has cutting portions, so that a warping of the lower receiving container 700 may be prevented despite the contraction of the mold frame 3600.

The cutting portion may include a first end portion and a second end portion. The first end portion may have a curved cutting plane or edge. The second end portion is spaced apart from the first end portion. The second end portion faces the first end portion. The second end portion may have a curved cutting plane corresponding to the curved cutting plane of the first end portion. Since the mold frame 600 has the cutting portion, a foreign substance may enter into an inner space of a display apparatus through the cutting portion. However, the first end portion and the second end portion according to the present exemplary embodiment have curved cutting planes, so that an inflow of the foreign substance may be prevented.

The lower receiving container 700 may receive the light source unit. The lower receiving container 700 may include a material having superior strength, such as metal. For example, the lower receiving container 700 may be formed as a metal chassis.

The lower receiving container 700 may be integrally formed with the mold frame 3600. The mold frame 3600 may be formed on the lower receiving container 700 by an insert injection molding process. After the lower receiving container 700 is disposed in a mold of the mold frame 3600, a mold material is inserted into the mold. Thus, the mold frame 3600 may be directly formed on the lower receiving container 700. When a mold frame and a lower receiving container are manufactured separately, a gap between the mold frame and the lower receiving container may be generated. However, the mold frame 3600 according to the present exemplary embodiment is directly formed on the lower receiving container 700, so that a gap between the mold frame and the lower receiving container may be minimized.

Figure 10:
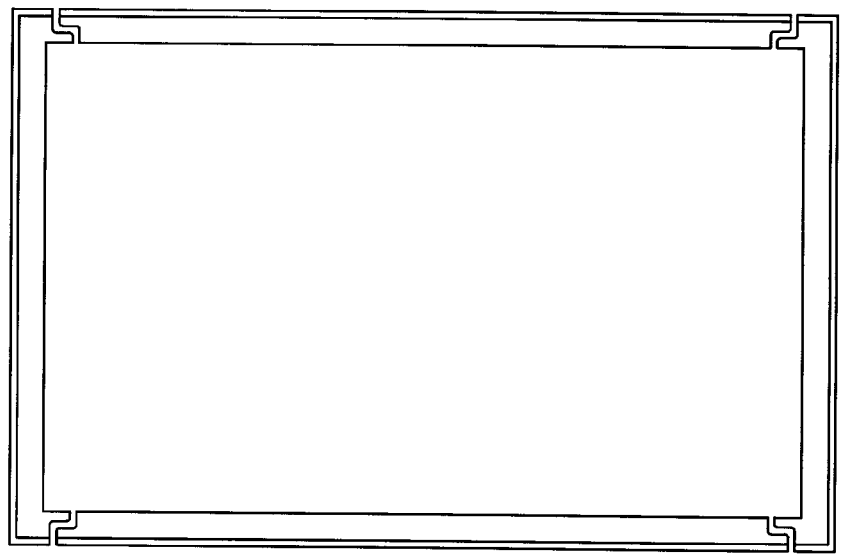
FIG. 10 is a plan view illustrating an exemplary embodiment of a mold frame according to the invention.

FIG. 10 is a plan view illustrating an exemplary embodiment of a mold frame according to the invention.

Referring to FIG. 10, the mold frame 3600 may include a plurality of cutting portions formed in a first longer side of the mold frame 3600 and in a second longer side facing the first longer side. For example, the cutting portions may be formed at both ends of the first longer side of the mold frame 3600 and at both ends of the second longer side of the mold frame 3600. In the present exemplary embodiment, the mold frame 3600 may have four cutting portions. However, any number and placement of cutting portions is contemplated.

The mold frame 3600 may be formed on the lower receiving container 700 by an insert injection molding process. Thus, the mold frame 3600 is integrally formed with the lower receiving container 700. Accordingly, when the mold frame 3600 without cutting portions is constricted, the lower receiving container 700 may be warped. However, the mold frame 3600 according to the present exemplary embodiment has the cutting portions, so that a warping of the lower receiving container 700 may be prevented despite the contraction of the mold frame 3600.

The cutting portions according to the present exemplary embodiment may be formed in substantially the same shapes as the cutting portions in FIG. 4. The cutting portions may include a first end portion 630 and a second end portion 640. The first end portion 630 may have a curved or piecewise linear cutting plane or edge profile. The second end portion 640 is spaced apart from the first end portion 630. The second end portion 640 faces the first end portion 630. The second end portion 640 may have a curved or piecewise linear cutting plane corresponding to the curved cutting plane of the first end portion 630.

Since the mold frame 3600 has the cutting portion, a foreign substance may enter into an inner space of a display apparatus through the cutting portion. However, the first end portion and the second end portion according to the present exemplary embodiment have curved cutting planes, so that an inflow of the foreign substance may be prevented.

Figure 11:
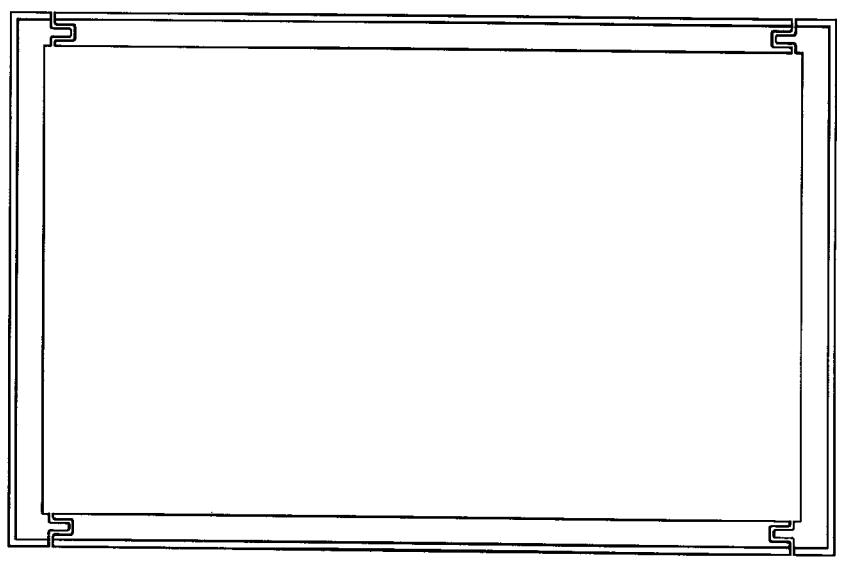
FIG. 11 is a plan view illustrating another exemplary embodiment of a mold frame according to the invention.

FIG. 11 is a plan view illustrating another exemplary embodiment of a mold frame according to the invention.

Referring to FIG. 11, the mold frame 4600 may include a plurality of cutting portions formed in a first longer side of the mold frame 4600 and in a second longer side facing the first longer side. For example, the cutting portions may be formed at both ends of the first longer side of the mold frame 4600 and at both ends of the second longer side of the mold frame 4600. In the present exemplary embodiment, the mold frame 4600 may have four cutting portions.

The mold frame 4600 may be formed on the lower receiving container 700 by an insert injection molding process. Thus, the mold frame 4600 is integrally formed with the lower receiving container 700. Accordingly, when the mold frame 4600 without cutting portions is constricted, the lower receiving container 700 may be warped. However, the mold frame 4600 according to the present exemplary embodiment has the cutting portions, so that a warping of the lower receiving container 700 may be prevented despite the contraction of the mold frame 4600.

The cutting portions according to the present exemplary embodiment may be formed in substantially the same shapes as the cutting portions in FIG. 6. The cutting portions may include a first end portion 1630 and a second end portion 1640. The first end portion 1630 may have a protruding portion. The second end portion 1640 is spaced apart from the first end portion 1630. The second end portion 640 faces the first end portion 1630. The second end portion 1640 may have a dent portion or recess corresponding to the protruding portion of the first end portion 1630.

Since the mold frame 4600 has the cutting portion, a foreign substance may enter into an inner space of a display apparatus through the cutting portion. However, the first end portion and the second end portion according to the present exemplary embodiment have the protruding portion and the dent portion respectively, so that an inflow of the foreign substance may be prevented.

Figure 12:
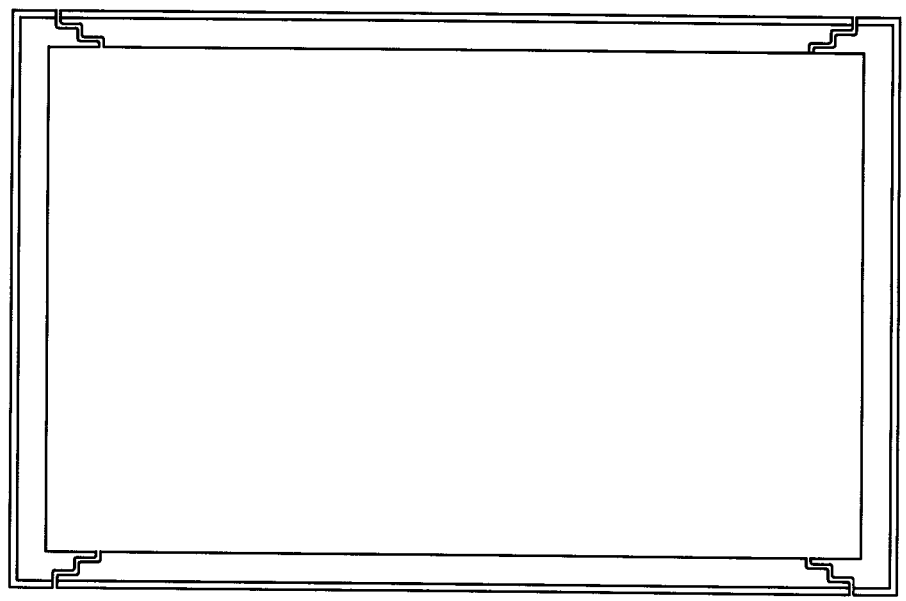
FIG. 12 is a plan view illustrating still another exemplary embodiment of a mold frame according to the invention.

FIG. 12 is a plan view illustrating still another exemplary embodiment of a mold frame according to the invention.

Referring to FIG. 12, the mold frame 5600 may include a plurality of cutting portions formed in a first longer side of the mold frame 5600 and in a second longer side facing the first longer side. For example, the cutting portions may be formed at both ends of the first longer side of the mold frame 5600 and at both ends of the second longer side of the mold frame 5600. In the present exemplary embodiment, the mold frame 5600 may have four cutting portions, although any number and placement is contemplated.

The mold frame 5600 may be formed on the lower receiving container 700 by an insert injection molding process. Thus, the mold frame 5600 is integrally formed with the lower receiving container 700. Accordingly, when the mold frame 5600 without cutting portions is constricted, the lower receiving container 700 may be warped. However, the mold frame 5600 according to the present exemplary embodiment has the cutting portions, so that a warping of the lower receiving container 700 may be prevented despite the contraction of the mold frame 5600.

The cutting portions according to the present exemplary embodiment may be formed in substantially the same shape as the cutting portions in FIG. 8. The cutting portions may include a first end portion 2630 and a second end portion 2640. The first end portion 2630 may have a doubly curved cutting plane with a step shaped profile having alternating vertical and horizontal portions. The second end portion 2640 is spaced apart from the first end portion 2630. The second end portion 2640 faces the first end portion 2630. The second end portion 2640 may have a doubly curved cutting plane corresponding to the curved cutting plane of the first end portion 2630.

Since the mold frame 5600 has the cutting portion, a foreign substance may enter into an inner space of a display apparatus through the cutting portion. However, the first end portion and the second end portion according to the present exemplary embodiment have the curved cutting plane, so that an inflow of the foreign substance may be prevented.

According to one or more exemplary embodiment, a mold frame has a plurality of cutting portions. Thus, a warping of the lower receiving container may be prevented despite the contraction of the mold frame.

In addition, end portions of the cutting portions have the curved cutting plane. Thus, an inflow of the foreign substance may be prevented.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein. Any features of the various embodiments can be mixed and matched in any manner, to produce other embodiments contemplated by the invention.

What is claimed is:

1. A backlight assembly comprising:
a light source unit configured to generate light;
a lower receiving container having a bottom portion and a side wall and being configured to receive the light source unit, the lower receiving container shaped to cover a lower surface of the light source unit; and
a mold frame formed directly on the lower receiving container and having a cut portion, the cut portion having a first end portion and a second end portion, the first end portion and the second end portion spaced apart from each other and facing each other with a gap therebetween.

2. The backlight assembly of claim 1, wherein the lower receiving container comprises a securing portion formed on the side wall.

3. The backlight assembly of claim 1, wherein the lower receiving container comprises metal and the mold frame comprises macromolecule.

4. The backlight assembly of claim 1, wherein a lower surface of the mold frame contacts an upper surface of the bottom portion of the lower receiving container, an inner surface of the side wall of the lower receiving container contacts a side surface of the mold frame, and an upper surface of the lower receiving container is covered by the mold frame.

5. The backlight assembly of claim 1, the first end portion and the second end portion each having curved edges.

6. The backlight assembly of claim 1, wherein the first end portion has a protruding portion, and the second end portion has a recessed portion corresponding to the protruding portion.

7. The backlight assembly of claim 1, wherein a plurality of cutting portions are formed in a longer side of the mold frame.

8. The backlight assembly of claim 1, wherein a plurality of cutting portions are formed in a first longer side and a second longer side of the mold frame, the second longer side facing the first longer side.

9. The backlight assembly of claim 1, wherein the mold frame comprises at least one selected from the group consisting of polymethyl methacrylate and polycarbonate.

10. A display apparatus comprising:
a display panel configured to display an image;
a lower receiving container configured to receive the display panel, the lower receiving container having a bottom portion and a side wall; and
a mold frame formed directly on the lower receiving container and having a cut portion, the cut portion having a first end portion and a second end portion, the first end portion and the second end portion spaced apart from each other and facing each other.

11. The display apparatus of claim 10, further comprising:
a light source unit disposed between the display panel and the lower receiving container.

12. The display apparatus of claim 10, wherein the light source unit comprises:
a flexible printed circuit board;
a light source disposed on the flexible printed circuit board; and
a light guide plate configured to guide light from the light source.

13. The display apparatus of claim 10, wherein the lower receiving container comprises a securing portion formed on the side wall.

14. The display apparatus of claim 10, wherein the lower receiving container comprises metal and the mold frame comprises macromolecule.

15. The display apparatus of claim 10, wherein a lower surface of the mold frame contacts an upper surface of the bottom portion of the lower receiving container, an inner surface of the side wall of the lower receiving container contacts a side surface of the mold frame, and an upper surface of the lower receiving container is covered by the mold frame.

16. The display apparatus of claim 10, the first end portion and the second end portion each having curved edges.

17. The display apparatus of claim 10, wherein the first end portion has a protruding portion, and the second end portion has a recessed portion corresponding to the protruding portion.

18. The display apparatus of claim 10, wherein a plurality of cutting portions are formed in a longer side of the mold frame.

19. The display apparatus of claim 10, wherein a plurality of cutting portions are formed in a first longer side and a second longer side of the mold frame, the second longer side facing the first longer side.

20. The display apparatus of claim 10, wherein the mold frame comprises at least one selected from the group consisting of polymethyl methacrylate and polycarbonate.

* * * * *